United States Patent [19]

Suzuki et al.

[11] Patent Number: 4,610,554
[45] Date of Patent: Sep. 9, 1986

[54] INK COMPOSITION AND WIRE DOT PRINTER INCLUDING SAME

[75] Inventors: Takashi Suzuki; Makoto Matsuzaki; Masanao Matsuzawa; Yoshinori Miyazawa, all of Shiojiri, Japan

[73] Assignee: Seiko Epson Corporation, Tokyo, Japan

[21] Appl. No.: 684,554

[22] Filed: Dec. 21, 1984

[30] Foreign Application Priority Data

Dec. 23, 1983 [JP] Japan ............... 58-243544
Apr. 4, 1984 [JP] Japan ............... 59-67285

[51] Int. Cl.⁴ .................. B41J 3/12; C09D 11/00
[52] U.S. Cl. .................... 400/124; 106/20; 400/470
[58] Field of Search ........... 400/124, 470, 471, 471.1; 106/20

[56] References Cited

U.S. PATENT DOCUMENTS 2,690,973 10/1954 Voet ........................ 106/20
4,194,846 3/1980 Zerillo ................... 400/471.1 X
4,279,519 7/1981 Shiurila .................. 400/471.1 X
4,289,678 9/1981 Calder ..................... 106/20 X
4,301,049 11/1981 Funatsu .................... 106/20 X
4,400,102 8/1983 Shiurila .................. 400/471.1 X
4,456,393 6/1984 Gomi ...................... 400/124

FOREIGN PATENT DOCUMENTS 97009 12/1983 European Pat. Off. ......... 400/124

Primary Examiner—Paul T. Sewell
Attorney, Agent, or Firm—Blum Kaplan Friedman Silberman & Beran

[57] ABSTRACT

A wire dot printer that requires no cover over the wire portion of the printer head when not in service in order to prevent ink drying is constructed using an ink supply devoid of water. The ink composition used in such an ink wire dot printer contains a water soluable dyestuff or an oleaginous dyestuff which is soluable in a polar solvent, a polyhydric alcohol or a derivative thereof and a water soluable amine.

16 Claims, 3 Drawing Figures

INK COMPOSITION AND WIRE DOT PRINTER INCLUDING SAME

BACKGROUND OF THE INVENTION

This invention relates to wire dot printers and, more particularly, to an ink composition and a wire dot printer including the composition.

Conventional wire dot printers utilize an ink ribbon for transferring ink onto recording paper. There are, however, drawbacks to using such conventional wire dot printers. The useful life of an ink ribbon is short and consequently the ribbon must be changed frequently. Additionally, it is necessary to provide a feeding mechanism for feeding or advancing the ink ribbon in order for the printer to function properly, and therefore, the structure of the printer is more complex. Furthermore, print density of the ink ribbon at the beginning is different compared to the end of the ink ribbon.

In order to avoid such shortcomings in the art, an ink wire dot printer can transfer ink onto a recording paper by placing the ink directly on a wire tip without using an ink ribbon. Such ink wire dot printers transfer ink from an ink tank to the wire tip by an impregnation member, a capillary tube or pump mechanism. Various methods, for example, are disclosed in applicant's Japanese laid-open Application No. 164,173/1980, Japanese laid-open Application No. 6783/1982, U.S. Application No. 502,857, Japanese Utility Model Publication No. 2652/1978 and U.S. Pat. No. 4,194,846. The ink compositions disclosed include principally a polyhydric alcohol wetting agent and water.

The use of water as the solvent of an ink composition in an ink wire dot printer has many disadvantages. The head of an ink wire dot printer is an open type of structure. It is difficult to provide a closed structure for such a device to avoid ink drying as in the case of an ink jet head. Thus, when the head is left unused for a period of time, the water in the ink will evaporate. Additionally, the ink solvent which is at the periphery of the distal end of the wire will become highly viscous, reducing the ink's fluidity. Furthermore, as water continues to evaporate, sufficient ink cannot be transferred onto a recording paper by the wire so that the dots are lightly printed and finally, the shape of the ink dot formed is improper. In this case the ink will not permeate the paper surface and remains thereon after printing as the surface tension is too high. In extreme cases, when the ink is allowed to dry for a long period of time, the wire of the ink printer becomes clogged and the printing device cannot be used at all.

Japanese laid-open Application No. 75874/1981 discloses a method for preventing ink from drying by covering the wire portion of the printer head when not in service. However, this method requires removal of the cover when operation begins and reattachment of the cover when operation concludes. The user of such a device is substantially inconvenienced each time the printer is used. Accordingly, it is desirable to provide an ink wire dot printer and an ink composition used in the printer which will not dry out when exposed to the air. This type of ink is desirable because no special structure is necessary to maintain workability of the printing machine.

SUMMARY OF THE INVENTION

Generally speaking, in accordance with the invention, there is provided a wire dot printer having an ink supply of an ink solvent and wetting agent without including any water. Specifically, the ink composition used in the ink wire dot printer includes a water soluble dyestuff or an oleaginous dyestuff which is soluble in a polar solvent, a polyhydric alcohol or a derivative thereof and a water-soluble amine. The polyhydric alcohol is used in the ink composition as a wetting agent and a solvent in order to lower the vapor pressure of the ink, to impede evaporation of the ink and to accelerate dissolution of the dyestuff. The water soluble amine is used to prevent corrosion and oxidation of the metal wire in the dot printer. By using such an ink composition in a wire dot printer, a proper quantity of ink is retained on the wire tip of the printer at all times during use without providing any special protective means against ink drying.

Accordingly, it is an object of the invention to provide an improved ink-supplied wire dot printer.

It is another object of the invention to provide an improved ink composition used in an ink-supplied wire dot printer.

It is a further object of the invention to provide an improved ink composition which has a solvent containing no water.

It is still another object of the invention to provide an improved ink composition that is resistant to evaporation.

It is another object of the invention to provide an ink composition which remains on the wire tip of a wire dot printer without providing any special protective means.

Still another object of the invention is to provide an ink composition used in a wire dot printer which has good print quality and uniform ink dot density.

Still a further object of the invention is to provide an ink composition useful in an ink wire dot printer which does not have a negative chemical reaction on the metal wire of the head of the printer.

Still other objects and advantages of the invention will in part be obvious and will in part be apparent from the specification.

The invention accordingly comprises a composition of matter possessing the characteristics, properties and the relation of constituents which will be exemplified in the composition hereinafter described and the apparatus embodying features of construction, combination of elements and arrangement of parts which are adapted to affect such characteristics, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
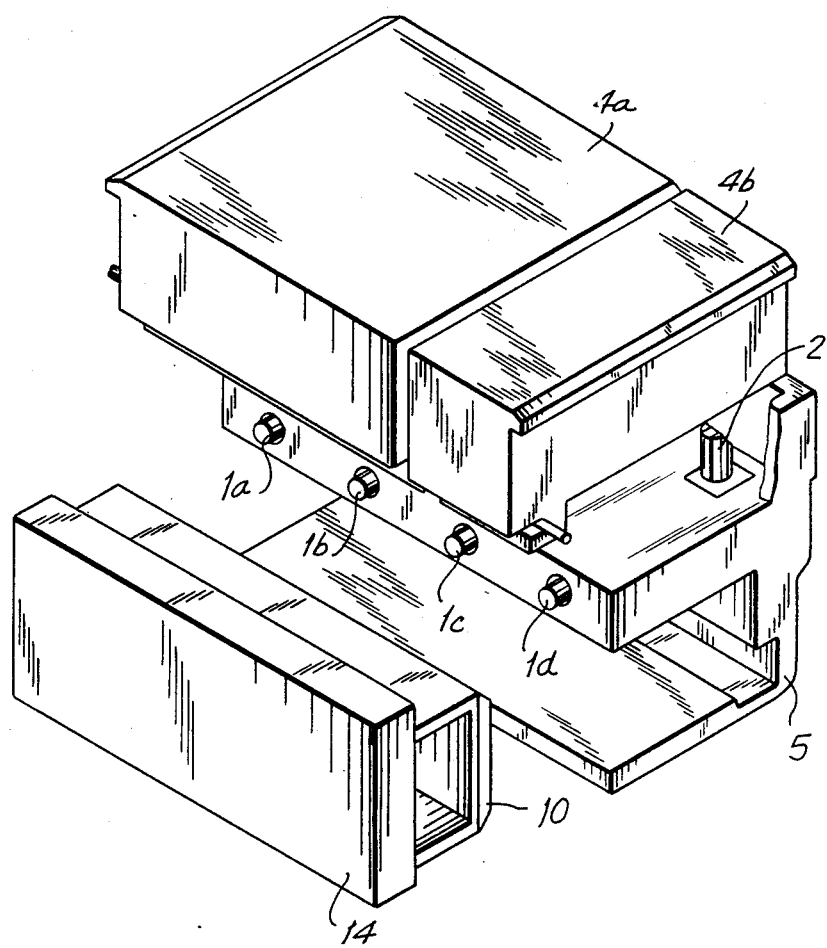
FIG. 1 is an exploded perspective view of one embodiment of an ink dot printer in accordance with the invention.

The ink composition prepared in accordance with the invention for use in an ink wire dot printer does not include water. The ink composition includes a water soluble dyestuff or an oleaginous dyestuff soluble in a polar solvent, a polyhydric alcohol or a derivative thereof, and a water-soluble amine. Preferably, the ink should have a viscosity between about 20 to 70 centipoise at 20° C., a surface tension between about 35-50 dyn/cm, and a pH between about 8-11 in a 20% aqueous solution.

A direct dye, acidic dyes, edible coloring matter and the like are suitable for use as the water-soluble dyestuff used in accordance with the invention. A dye soluble in a polar solvent may be used as the oleaginous dyestuff.

Examples of suitable water soluble dyestuff include, Direct Deep Black XA (C.I. Direct Black 38 similarity), Kayaku Direct Deep Black EX (ditto 38), Kayaku Direct Fast Black (ditto 51), Water Black L200 (ditto 19), Direct Fast Black AB (ditto 32), Direct Fast Black B (ditto 22), Nigrosin (C.I. Acid Black 2), Suminol Miling Black 8 BX (ditto 24), Kayanol Milling Black VLG (ditto 26), Suminol Milling Black NB (ditto 29), Aizen Opal Black WH (ditto 52), Water Black 187-L (ditto 154), Daiwa Black #1000, Daiwa Black #2000 (C.I. Direct Black 154 similarity), Mitsui R-052 (manufactured by Mitsui Toatsu Chemicals), Aizen Opanl Black WCH (C.I. Acid Black 52) Kayaku Direct Brilliant Yellow G (C.I. Direct Yellow 4), Aizen Primura Yellow 5 GLH (ditto 26), Aizen Purimura Yellow GCLH (ditto 44), Direct Fast yellow R (ditto 50), Fast Yellow (C.I. Acid Yellow 9), Mitsui Acid Fast Yellow G (ditto 17), Suminol Belling Yellow NR (ditto 1), Water Yellow #1 (ditto 23), Suminol Fast Yellow R (ditto 25), Metanil Yellow (ditto 36), Water Yellow #6 (ditto 42), Daiwa Yellow #330H (manufactured by Daiwa Chemical Industry), Daiwa Yellow #300 (C.I. Acid Yellow 79 similarity), Sunset Yellow (C.I. Food Yellow 3), Sumitomo SI Yellow 1A (manufactured by Sumitomo Chemical), Sumitomo S.I. Y-10A Direct Yellow 50 (C.I. Direct Yellow 50), Direct Yellow 86 (C.I. Direct Yellow 86), Kayaku Direct Scarlet B (C.I. Direct Red 37), Aizen Direct Fast Red FH (ditto 1), Aizen Purimura Scarlet GSH (ditto 4), Aizen Direct Low Dulling Red BH (ditto 31), Aizen Purimura Red 4BH (ditto 81), Direct Fast Scarlet 4BS (ditto 23), Kayaku Direct Scarlet 3B (39), Aizen Purimura Pink 2BLH (ditto 75), Suminol Fast Red GG (C.I. Acid Orange 19), Naphthol Orange (ditto 20), Suminol Milling Orange R (ditto 45), Water Orange #18 (56), Solar Red RB (C.I. Acid Red 7), Solar Rubin (ditto 14), New Cocusine (ditto 18), Acid Rhodamine G (ditto 50), Erythrocin (ditto 51), Kayaku Acid Rhodamine FB (ditto 52), Water Red #2 (ditto 87), Water Pink #2 (ditto 92), Aizen Rose Bengal (ditto 94), Suminol Brilliant Scarlet DH (ditto 97), Mitsui Acid Violet 6BN (C.I. Acid Violet 15), Mitsui Acid Violet BN (dito 17), Water Red 1, 2, 3, 5, 9 (manufactured by Orient Chemicals), KST Red 008, KST Red 009, Acid Red 254, KST Red FBSP KST Red I-143 (C.I. Acid Red 254 similarity), Daiwa Red M81 (Daiwa Chemical Industry), Sumitomo S.I.R-3A, Sumitomo S.I.R-10A, Sumitomo J.I.M.-1, 2, 10 (C.I. Acid 254 similarity), Amaranth (C.I. Food Red 9), Kayaku Direct Sky Blue 6B (C.I. Direct Blue 1), Aizen Direct Sky Blue 5BH (ditto 15), Mitsui Direct Blue 2BN (ditto 6), Kayarasu Supura Turquoise Blue FBL (ditto 199), Water Blue #3 (ditto 86), Kayarasu Blue G conc. (ditto 78), Kayarasupura Blue FF2GL (ditto 106), Batent Blue V (C.I. Acid Blue 1), Batent Blue AF (ditto 7), Water Blue #9 (ditto 9), Water Blue #116 (ditto 15), Orient Soluble Blue OBC (ditto 22), Mitsui Nylon Fast Blue G (ditto 25), Suminol Fast Blue 3G (ditto 27), Daiwa Indigo Carmine (ditto 74), Water Blue #115 (ditto 90), Orient Soluble Blue OBB (ditto 93), Water Blue 105, 105S (Orient Chemical), Daiwa Blue 300, 300B, 700 (Daiwa Chemical Industry), Tarcois I-M (C.I. Direct Blue 86 similarity), Water Blue 117, 188 (Orient Chemical), Sumitomo J, I.C-1, 2, 3, 4 (C.I. Direct Blue 86 similarity), Daiwa Green #70 (Daiwa Chemical Industry), Acid Brilliant Milling Green B (C.I. Acid Green 9), and Food Green No. 2 (C.I. Food Green 2).

The water-soluble dyestuff may be used singly or in combination of more than one type of dye. The amount of water-soluble dye included in the composition may vary depending on the printing density and the printing medium. Generally, the water-soluble dye will be included in an amount between about 2 to 20 weight percent of the composition.

The polyhydric alcohol or its deratives are used in the composition as a wetting agent and a solvent. Its effect is to lower the vapor pressure of the ink, to impede evaporation, and to accelerate dissolution of the dyestuff. It is preferred that it comprise a first liquid component with a boiling point greater than or equal to 200° C., a freezing point less than or equal to 20° C., a vapor pressure at 20° C. less than or equal to 0.01 mm of mercury and a viscosity at 20° C. greater than or equal to 50 centipoise, and a second liquid component having a boiling point of at least about 120° C., a freezing point of about 0° C. or less, a vapor pressure at 20° C. of 6 mm of mercury or less and a viscosity at 20° C. of about 50 centipoises or less. The polyhydric alcohol or its derivatives thereof may be one type or may be a mixture thereof. Preferably, the polyhydric alcohol comprises at least about 80% by weight of the ink composition.

The polyhydric alcohol and derivatives thereof may be selected from the group of ethylene glycol, diethylene glycol, triethylene glycol, polyethylene glycol, propylene glycol, glycerol and the like, an alkylether derivative of polyhydric alcohol such as ethylene glycol monomethyl ether, ethylene glycol monoethyl ether, ehylene glycol monobutyl ether, diethylene glycol monomethyl ether, diethylene glycol monoethylene ether, diethylene glycol monobutyl ether, diethylene glycol dimethyl ether, diethylene glycol methyethyl ether, diethylene glycol diethyl ether, triethylene glycol monomethyl ether, triethylene glycol dimethyl ether, triethylene glycol ether, triethylene glycol monoethyl ether, tetraethylene glycol-monoethyl ether, tetraethylene glycol-dimethyl ether, glycerolmonomethyl ether, glyceryl ether and the like, alkylether acetate derivative of polyhydric alcohol such as ethylene glycolmonomethyl ether acetate, ethylene glycol monoethyl ether acetate, diethylene glycol monoethyl ether acetate and the like, nitrogen-contained and oxygen-contained cyclic compounds such as 2-pyrolidone, N-methyl-2-pyrolidone, 1, 3 dimethyl imidazolidinon, 4-butyrolactone, tryhydroxyisocyanate and the like.

The ink compositions in accordance with the invention also include a water-soluable amine. It is preferred that the amine have a freezing point of about 21° C. or less, a vapor pressure at 20° C. of about 0.01 mm of mercury or less, and a boiling point of at least about 200° C. The amine acts as a solvent in the composition and prevents corrosion and oxidation of metal print wires in a wire dot printer. These print wires come into contact with the ink and are generally formed of cobalt, nickel and iron. The ink composition should preferably include between about 3–10% by weight of amine. The amine is selected from diethanolamine, triethanolamine, and derivatives of tris (polyoxyethylene) amine. In order to prevent the formation of mold, it may also be useful to add as a preventative formalin, phenol, pentachlorophenol, sodium dehydroacetate, or Hoxide LX-H (Hokko Chemical).

The ink compositions, in accordance with the invention have a viscosity at 20° C. between about 20–70 cp, surface tension between 35–50 dyn/cm and a pH of between about 8–11. If viscosity falls below a level of about 20 cp, the ink tends to feed too quickly onto the wire tip, and consequently, a scatter or blot occurs when applied to the paper. If the ink viscosity rises above about 70 cp, insufficient ink will be fed to the wire tip which causes unclear print on the paper.

If the surface tension of the ink composition is below about 35 dyn/cm, the ink permeates the paper smoothly and prevents print on the paper from blotting. When the surface tension is above about 50 dyn/cm permeation into the paper is retarded which may cause blurring. Thus, surface tension should be kept within the range stated in order to provide a short drying time for providing circular printing dots.

If the pH of the ink composition falls below about 8, corrosion or oxidation of the metal wire ink may occur. Corrosion or oxidation is more likely to occur when pH falls below that level if the ink is left in the wire for long periods of time.

Since the ink composition does not include water, the problem of increasing viscosity and hardening due to evaporation of water and drying is not present. Hence, prevention of ink drying on the tip of the wire by mechanical means is not required and the ink dries quickly after contact with the paper in the printing process. Thus, a wire dot printer in accordance with the invention provides consistent quality printing. Furthermore, since the composition includes a water soluble solvent and the ink composition is hydroscopic, changes in the humidity of the environment will not affect the quality of ink printing.

In order to prevent chemical corrosion of the wire of the dot printer it is known to increase the alkalinity of the ink used. In the case of an ink composition containing a water solvent, the pH of the composition is increased by adding alkaline metal salt or using less dyestuff in the composition. This presents a problem in that the alkali metal salt precipitates out upon evaporation of the water and suitable dyestuffs are limited. However, by using a water-soluble amine as a solvent in accordance with the invention which is itself alkaline, insoluble material is not formed and the pH is controlled at all times. Additionally, the amine solvent in the composition permits use of an unlimited number of dyestuffs.

The following examples of ink compositions in accordance with the invention are presented by way of illustration only, and are not intended in a limiting sense. In the Examples, "parts" refers to percentage by weight of each component of the composition.

EXAMPLE 1

The following components were mixed and then heated and stirred at a temperature of 70°–80° C. for six hours.

C.I. Acid Black 52—6.0 parts
Polyethylene glycol (m.w. 400)—35.0 parts
Polyethylene glycol (m.w. 200)—20.0 parts
Diethylene glycol monomethyl ether—34.0 parts
Triethanolamine—5.0 parts Impurities were removed by a 5 Teflon filter. A black ink product was obtained having a viscosity of 61.9 cp, a surface tension of 44.2 dyn/cm and a pH (20° aqueous solution) of 8.5.

EXAMPLE 2

The following components were mixed and then heated and stirred at a temperature of 70°–80° C. for six hours.

C.I. Direct Black 154—5.0 parts
Polyethylene glycol (m.w. 400)—25.0 parts
Polyethylene glycol (m.w. 200)—20.0 parts
Triethylene glycol monomethyl ether—45.0 parts
Tris (polyoxyethylene) amine (m.w. 400) (hereinafter referred to as TEA-400)—5.0 parts Impurities were removed by a 5 Teflon filter. A black ink product was obtained having a viscosity of 47.1 cp, a surface tension of 44.3 dyn/cm and a pH (20% aqueous solution) of 10.5.

EXAMPLE 3

The following components were mixed and then heated and stirred at a temperature of 70°–80° C. for six hours.

C.I. Acid Red 254—3.6 parts
C.I. Direct Yellow 79—3.0 parts
Polyethylene glycol (m.w. 300)—25.0 parts
Polyethylene glycol (m.w. 200)—20.0 parts
Triethylene glycol monomethyl ether—43.4 parts
TEA-400—5.0 parts Impurities were removed by a 5 Teflon filter. A red ink product was obtained having a viscosity of 44.3 cp, a surface tension of 44.1 dyn/cm and a pH (10% aqueous solution) of 8.5.

EXAMPLE 4

The following components were mixed and then heated and stirred at a temperature of 70°–80° C. for six hours.

C.I. Direct Blue 86 similarity—3.6 parts
C.I. Direct Yellow 79—3.0 parts
Polyethylene glycol (m.w. 300)—30.0 parts
Polyethylene glycol (m.w. 200)—20.0 parts
Triethylene glycol monomethyl ether—38.4 parts
TEA-400—5.0 parts Impurities were removed by a 5 Teflon filter. A green ink product was obtained having a viscosity of 52.3 cp, a surface tension of 43.8 dyn/cm and a pH (10% aqueous solution) of 8.3.

EXAMPLE 5

The following components were mixed and then heated and stirred at a temperature of 70°–80° C. for six hours.

C.I. Acid Blue 9—6.0 parts
Polyethylene glycol (m.w. 400)—25.0 parts
Polyethylene glycol (m.w. 200)—20.0 parts
Triethylene glycol monomethyl ether—22.0 parts
Diethylene glycol monomethyl ether—22.0 parts
TEA-400—5.0 parts Impurities were removed by a 5 Teflon filter. A blue ink product was obtained having a viscosity of 45.0 cp, a surface tension of 44.3 dyn/cm and a pH (20% aqueous solution) of 8.2.

EXAMPLE 6

The following components were mixed and then heated and stirred at a temperature of 70°–80° C. for six hours.

C.I. Direct Blue 86 similarity—6.0 parts
Polyethylene glycol (m.w. 300)—25.0 parts
Polyethylene glycol (m.w. 200)—20.0 parts
Triethylene glycol monomethyl ether—44.0 parts
TEA-400—5.0 parts Impurities were removed by a 5 Teflon filter. A cyanic ink product was obtained having a viscosity of 29.6 cp, a surface tension of 43.6 dyn/cm and a pH (20% aqueous solution) of 8.3.

EXAMPLE 7

The following components were mixed and then heated and stirred at a temperature of 70°–80° C. for six hours.

C.I. Acid Red 254—6.0 parts
Polyethylene glycol (m.w. 300)—25.0 parts
Polyethytlene glycol (m.w. 200)—20.0 parts
Triethylene glycol monomethyl ether—44.0 parts
TEA-400—5.0 parts Impurities were removed by a 5 Teflon filter. A magenta ink product was obtained having a viscosity of 42.6 cp, a surface tension of 43.1 dyn/cm and a pH (20% aqueous solution) of 8.4.

EXAMPLE 8

The following components were mixed and then heated and stirred at a temperature of 70°–80° C. for six hours.

C.I. Direct Yellow 79—6.0 parts
Polyethylene glycol (m.w. 400)—25.0 parts
Polyethylene glycol (m.w. 200)—20.0 parts
Diethylene glycol monomethyl ether—44.0 parts
TEA-400—5.0 parts Impurities were removed by a 5 Teflon filter. A yellow ink product was obtained having a viscosity of 44.8 cp, a surface tension of 44.1 dyn/cm and a pH (20% aqueous solution) of 8.6.

EXAMPLE 9

The following components were mixed and then heated and stirred at a temperature of 70°–80° C. for six hours.

Triethylene glycol dimethylether—40.0 parts
Polyethylene glycol (m.w. 400)—25.0 parts
Polyethylene glycol (m.w. 200)—20.0 parts
TEA-400—5.0 parts
Dyestuff—10.0 parts Impurities were removed by a 5 Teflon filter. An ink product was obtained having a viscosity of 48–50 cp, and a surface tension of 44–45 dyn/cm.

Comparative Example 1

The following components were mixed and then heated and stirred at a temperature of 70°–80° C. for six hours.

C.I. Acid Black 52—6.0 parts
Polyethylene glycol (m.w. 400)—40.0 parts
Polyethylene glycol (m.w. 200)—20.0 parts
Diethylene glycol monomethyl ether—34.0 parts Impurities were removed by a 5 Teflon filter. A black ink product was obtained having a viscosity of 62.1 cp, a surface tension of 44.1 dyn/cm and a pH (20% aqueous solution) of 3.5.

Comparative Example 2

The following components were mixed and then heated and stirred at a temperature of 70°–80° C. for six hours.

C.I. Acid Black 52—6.0 parts
Polyethylene glycol (m.w. 400)—35.0 parts
Polyethylene glycol (m.w. 200)—20.0 parts
Diethylene glycol monomethyl ether—14.0 parts
Triethanolamine—5.0 parts
Water—20.0 parts Impurities were removed by a 5 Teflon filter. A black ink product was obtained having a viscosity of 18.5 cp, a surface tension of 49.6 dyn/cm and a pH of 8.5.

Comparative Examples 3–5

The TEA-400 was removed as a component from the ink compositions and was replaced by 5.0 parts of polyethylene glycol (m.w. 400). Red, green and blue inks, respectively, were obtained by the addition of polyethylene glycol.

Comparative Example 6

The folowing components were mixed and then heated and stirred at a temperature of 70°–80° C. for six hours.

Water—62.0 parts
Triethylene glycol—29.0 parts Ethylene glycol—6.0 parts
Dyestuff—3.0 parts Impurities were removed by a 5 Teflon filter. An ink product was obtained having a viscosity of 4.2 cp and a surface tension of 52–53 dyn/cm.

The inks prepared in accordance with Examples 1–9 may be used in an ink wire dot printer without the need for additional mechanical means to retard the ink from drying as shown in Japanese Patent Application No. 191,529/83.

Figure 2:
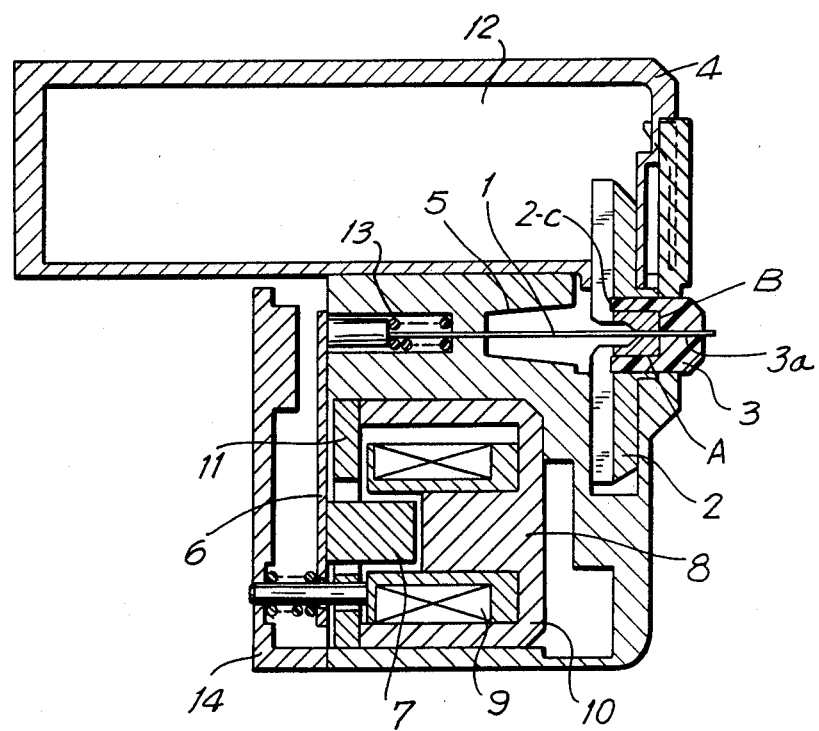
FIG. 2 is a sectional view of a print head of the ink wire dot printer in FIG. 1.
Figure 3:
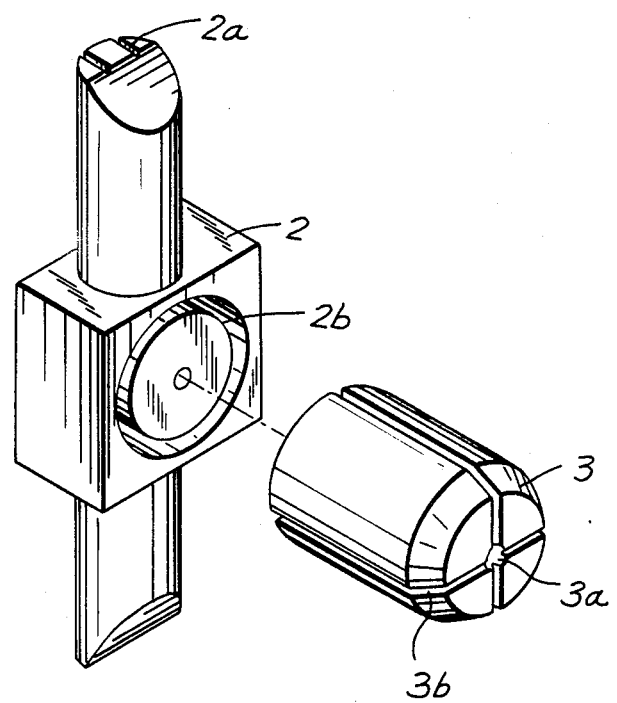
FIG. 3 is a perspective view of a feeding guide and a sticking guide of an ink wire dot printing head of FIGS. 1 and 2.

The head of the wire dot printer is illustrated in exploded perspective in FIG. 1. FIG. 2 is a sectional view of an ink feeding guide and an ink wire guide of the print head. The print head in this embodiment is a four-color printer-plotter and includes feeding systems for black, red, green and blue ink with a wire for each color. The four-color printer is utilized in a construction wherein one or both of the print head and recording paper moves. A wire corresponding to a desired color of the head is projected onto the recording paper at a predetermined spot to form a dot for providing characters and graphic forms.

The print head includes an ink tank 4 detachably mounted on the upper portion of the head. Ink tank 4 has a two-piece structure including an ink tank 4b for black ink and an ink tank 4a divided into three parts to hold ink of three colors. Ink is impregnated into a tank filler 12 of a porous material placed into ink tank 4. An ink feeding guide 2 includes an ink guide groove 2a extending axially from guide 2 which contacts tank filler 12. The width and depth of ink guide groove 2a is dimensioned so that ink may be fed uniformly from ink filler 12. The cylindrical surface of circumferential groove 2b is formed on the front side of ink feeding guide 2 and is connected to ink guide groove 2a by an internal portion 2c.

A wire guide 3 is placed in circumferential groove 2b of ink guide 2. The space between the outer cylindrical surface of wire guide 3 and the inner cylindrical surface of ink guide groove 2b is defined as gap B. The space between the front surface of ink guide 2 and wire guide 3, is defined as gap A. There is also a slight gap between wire 1 and a wire guide hole 3a of wire guide 3.

Ink is fed to the far tip of wire 1 from ink tank 4 by way of capillary action along guide groove 2a of ink feeding guide 2 and gap B and gap A of wire guide 3. In this embodiment of a four-color printer plotter, four print wires 1-a, 1-b, 1-c, and 1-d correspond to each of the four colors.

A wire drive unit is provided for each of the wires in the print head. The drive unit includes a magnetic circuit formed of a yoke 10 having a coil core 8 around which a coil 9 is wound, a yoke plate 11, and a plunger 7. Movement of plunger 7 is transmitted through a clapper 6 to wire 1. A cover 14 surrounds the wire driving unit and functions to limit the amount of stroke movement of clapper 6. When the device is in a standby position, the distal end portion of wire 1 is located towards the rear of the distal end surface of wire guide 3. The length of wire 1 is such that an ink meniscus is formed at the front portion of wire guide hole 3a and covers the distal end of wire 1.

During operation of the drive unit, coil 9 is energized and plunger 7 is attracted to coil core 8 causing clapper 6 to push wire 1 outwardly as wire 1 is biased against clapper 6. The distal end of wire 1 projects through the ink meniscus carrying some ink thereon and hits a sheet of print paper (not shown) to transfer the ink to the paper. When wire 1 is in a standby position, the distal end is located inwardly of the distal end surface of wire guide 3 so that the ink meniscus is formed in front of the distal end of wire 1. Accordingly, ink is repeatedly attached to the distal end of wire 1 as the wire is pushed forward and retracted. The transfer of ink to the distal end of wire 1 and other details of an ink wire dot matrix printing process are disclosed in U.S. patent application No. 502,857 assigned to the assignee and the specification is incorporated herein by reference.

Excess ink on the distal end surface of wire guide 3 is withdrawn by capillary action into cross-sectionally V-shaped collection grooves 3b formed on the front and side surfaces of wire guide 3. This excess ink is returned to ink supply guide 2 without smearing the print paper.

In accordance with the construction of wire guide hole 3a of the wire dot printer head, a portion of the ink is exposed to the air at all times. However, since the composition in accordance with the invention does not include water, but includes a polyhydric alcohol or a derivative thereof, evaporation of the ink is impeded despite exposure to the air. Consequently, a covering means for preventing ink drying is not necessary and printer construction is thus simplified. When operating the printer, it is necessary that a sufficient quantity of ink is placed securely on the wire tip in order to achieve satisfactory print quality. In this construction an ink passage is provided formed by ink guide 2 and wire guide 3 through grooves provided thereon and gaps therebetween. The result is that a sufficient quantity of ink is retained in the wire tip.

Because the ink composition used in the printer of the invention includes polyhydric alcohol and derivatives thereof, ink viscosity remains relatively low. Thus, ink flow is controlled more easily and ink feeding is accomplished more stably.

The ink used must dry quickly and must have little blotting when imprinted on the paper. Since the ink composition includes a solvent and a wetting agent consisting of polyhydric alcohol and derivatives thereof, the ink dries quickly without blotting when placed on the recording paper. Thus, print quality is excellent.

It is noted that the ink composition is not limited to use with the ink wire dot printer described. The ink composition can be used with any general ink dot printer which operates by placing a liquid ink composition on the printing end surface of a wire by means of gaps between the wire and a wire guide hole.

The inks in the earlier examples were used in the above described wire dot printer head using three different types of wires. The wires may be made of cobalt, nickel or iron.

Table 1 below discloses resulting print qualities using various ink compositions prepared in accordance with the Examples in an ink supplied wire dot printer constructed in accordance with the invention. Three different conditions were examined. The three conditions were initial print quality, print quality after the ink stands for an extended period of time, and any effect of the ink on the wire material.

TABLE 1

|  | Initial print | Print after left for a long time | Influence on wire |
| --- | --- | --- | --- |
| Example 1 | o | o | o |
| Comparative Example 1 | o | Δ | x |
| Comparative Example 2 | x | x | o |
| Example 2 | o | o | o |
| Example 3 | o | o | o |
| Comparative Example 3 | o | Δ | x |
| Example 4 | o | o | o |
| Comparative Example 4 | o | Δ | x |
| Example 5 | o | o | o |
| Comparative Example 5 | o | Δ | x |
| Example 6 | o | o | o |
| Example 7 | o | o | o |
| Example 8 | o | o | o | o Good
Δ Somewhat probematical
x Not good

The following definitions will describe the test results given in the Table.

Initial Print

The ink print was examined for its drawing ability, its lack of splatter, the circularness of the ink dot and the density of the printed test pattern by means of visual observation and microscopic analysis.

Print after left for a long time

The head of the ink printer was left in a 70° C. thermostatic oven for 360 hours without providing a drying protector such as a cover or the like thereon. The printing device was then operated. Ink print quality was determined by visual observation including comparison with a printing pattern from an initial print done before the machine was put in the thermostatic oven.

Influence on wire

After print evaluation, the print wires made of cobalt, nickel and iron were disassembled to examine them by visual observation and microscopic analysis. The results report solid deposits, discoloration, and corrosion.

The results according to table 1 show that a satisfactory print was obtained in each case with regard to initial print, print after the ink was exposed for a long time and influence on wire. In comparison, comparative examples 1-5 produce unsatisfactory results, particularly for prints made after a long period of time. Thus, the ink composition disclosed has superior drying ability and reliability when used in an ink wire dot printer.

Accordingly, an ink composition containing a solvent and a wetting agent consisting of a polyhydric alcohol and derivatives thereof to be used with an ink wire dot printer is provided. The major advantage of this ink composition is that evaporation is impeded without the use of a covering means and less blotting occurs when the ink is imprinted on recording paper.

It will thus be seen that the objects set forth, among those made apparent from the preceeding description, are efficiently attained and, since certain changes may be made in the above composition of matter and in the construction of the apparatus including the composition without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, may be said to fall therebetween.

Particularly, it is to be understood that in said claims, ingredients or compounds recited in the singular are intended to include compatible mixtures of such ingredients wherever the sense permits.

What is claimed is:

1. A non-aqueous ink composition comprising:
   (a) about 2-20% by weight of at least one dyestuff selected from the group of an oleaginous dyestuff and a water soluble dyestuff;
   (b) about 80% by weight of at least one polyhydric alcohol compound selected from the group of polyhydric alcohols and derivatives thereof; and
   (c) about 3-10% by weight of a water soluble amine wherein the viscosity of the composition is between 20-70 centipoise at 20° C., the pH is between 8-11 in a 20% aqueous solution and the surface tension is between 30-50 dyn/cm.

2. The ink composition of claim 1, wherein the polyhydric alcohol compound includes a first liquid component and a second liquid component.

3. The ink composition of claim 2, wherein said first liquid component has a boiling point greater than or equal to 200° C., a freezing point less than or equal to 20° C., a vapor pressure at 20° C. less than or equal to 0.01 mm of mercury and a viscosity at 20° C. greater than or equal to 50 centipoises, and said second liquid component has a boiling point greater than or equal to 120° C., a freezing point less than or equal to 0° C., a vapor pressure at 20° C. less than or equal to 6 mm of mercury and a viscosity at 20° C. less than or equal to 50 centipoises.

4. The ink composition of claim 1, wherein said water soluable amine has a freezing point less than or equal to 21° C., a vapor pressure at 20° C. less than or equal to 0.01 mm of mercury and a boiling point greater than or equal to 200° C.

5. The ink composition of claim 1, wherein said water soluble dyestuff includes at least one of a direct dyestuff, an acidic dyestuff and an edible coloring matter.

6. The ink composition of claim 1, wherein said oleaginous dyestuff includes any dyestuff which is soluble in a polar solvent.

7. The ink composition of claim 1, wherein said amine is selected from the group of diethanolamine, triethanolamine and derivatives of tris(polyoxyethylene)amines.

8. The ink composition of claim 1, wherein said at least one polyhydric alcohol compound is selected from the group of polyethylene glycol, triethylene glycol monomethyl ether and diethylene glycol monoethyl ether.

9. The ink composition of claim 1, wherein said at least one dyestuff is present between about 5 to 10% by weight, said at least one polyhydric alcohol compound is present between about 88.4 to 90% by weight and said water soluble amine is present in about 5% by weight.

10. The ink composition of claim 1, wherein viscosity is between about 29.6 to 52.3 centipoise at 20° C., the pH between 8.2 to 10.5 in a 20% aqueous solution and the surface tension between about 43.1 to 44.3 dyn/cm.

11. An ink supplied wire dot printer comprising an ink supply including between about 2-20% by weight of a dyestuff selected from an oleaginous dyestuff and a water soluble dyestuff; at least about 80% by weight of at least one polyhydric compound selected from a polyhydric alcohol and derivatives thereof, and between about 3-10% by weight of a water-soluble amine wherein said ink composition has a viscosity between about 20-70 centipoise at 20° C., a pH between 8-11 in 20% aqueous solution and a surface tension between 35-50 dyn/cm, said ink supply devoid of water.

12. The ink supplied wire dot printer of claim 11, including an ink supply tank containing an ink absorbing member and formed with an ink supply port;
   ink quide means extendng into said ink supply port for transporting ink from the ink supply tank, said ink guide member being formed with a wire guide opening for receiving and guiding an ink wire and with a capillary ink path communicating between the ink absorbing member and the side of a wire positioned within said wire guide opening.

13. The ink supplied wire dot printer of claim 12, further including a plurality of ink tanks for storing ink of various color and corresponding guide means and wires.

14. The ink supplied wire dot printer of claim 12 wherein said wires are formed of a metal selected from the group of cobalt, nickel and iron.

15. The ink supplied wire dot matrix printer of claim 12, wherein said ink guide means includes an ink guide member formed with an opening therethrough defining a capillary path between the ink tank and the side of the wire.

16. The ink supplied wire dot printer of claim 11, including an ink supply tank containing an ink absorbing member and formed with an ink supply port;
   ink guide means extending into said ink supply port for transporting ink from the ink supply tank, said ink guide member being formed with a wire guide opening for receiving and guiding an ink wire and with a capillary ink path communicating between the ink absorbing member and the side of a wire positioned within said wire guide opening, said capillary path after said ink absorbing member in a direction of ink flow, being entirely free of an absorbing material.

* * * * *

UNITED STATES PATENT AND TRADEMARK OFFICE
CERTIFICATE OF CORRECTION

PATENT NO. : 4,610,554

DATED : September 9, 1986

INVENTOR(S) : Takashi Suzuki; Makoto Matsuzaki; Masanao Matsuzawa; Yoshinori Miyazawa It is certified that error appears in the above-identified patent and that said Letters Patent is hereby corrected as shown below:

At column 5, line 39, change "hydroscopic" to --hygroscopic--.

Signed and Sealed this

Seventeenth Day of March, 1987

Attest:

DONALD J. QUIGG

Attesting Officer

Commissioner of Patents and Trademarks